US012792828B2

(12) United States Patent
Singh et al.

(10) Patent No.: US 12,792,828 B2
(45) Date of Patent: Nov. 10, 2026

(54) METHOD AND SYSTEM FOR GENERATING TEMPLATES FOR WORKFLOW APPLICATIONS

(71) Applicant: Honeywell International Inc., Charlotte, NC (US)

(72) Inventors: Ankit Singh, Apex, NC (US); Timothy Sneed, Beachwood, NJ (US); Abhishek Hiremath, Scarborough (CA)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 239 days.

(21) Appl. No.: 18/823,754

(22) Filed: Sep. 4, 2024

(65) Prior Publication Data

US 2026/0064954 A1 Mar. 5, 2026

(51) Int. Cl.

| | |
|---|---|
| ***G06F 3/00*** | (2006.01) |
| ***G06F 3/0484*** | (2022.01) |
| ***G06F 40/186*** | (2020.01) |
| *G06F 3/01* | (2006.01) |

(52) U.S. Cl.

CPC .......... *G06F 40/186* (2020.01); *G06F 3/0484* (2013.01)

(58) Field of Classification Search

None

See application file for complete search history.

(56) References Cited

U.S. PATENT DOCUMENTS

2008/0216147 A1* 9/2008 Duffy .................... G06Q 10/10 726/1
2008/0312963 A1* 12/2008 Reiner ............ G06Q 10/06398 705/7.42
2016/0234023 A1* 8/2016 Mozer ..................... G06F 21/32
2017/0315979 A1* 11/2017 Boucher ............... G06F 3/0482
2019/0251393 A1* 8/2019 Jiang ...................... G06V 40/50
2022/0121482 A1* 4/2022 Kumar .................... G06F 9/485
2023/0034344 A1* 2/2023 Jain .......................... G06N 3/04
2024/0134682 A1* 4/2024 Kulkarni ................ G06F 9/485

* cited by examiner

*Primary Examiner* — Toan H Vu

(74) *Attorney, Agent, or Firm* — Alston & Bird LLP

(57) ABSTRACT

The present disclosure relates to a method for generating templates for workflows associated with operations of a business enterprise. The method comprises selecting a workflow to be performed by one or more users. The method further comprises selecting a layout template comprising one or more user-interactive objects. The method further comprises selecting a chapter template associating the one or more user-interactive objects to data to be rendered on the selected layout template, wherein the data and the one or more user-interactive objects are associated with the one or more workflows selected by the one or more users. The method further comprises updating the chapter template by adding supplementary data to complete the one or more workflows and determining if the updated chapter template deviates from a standard chapter template beyond a pre-defined threshold, wherein the standard chapter template is a stored baseline template. In response to determining that the updated chapter template deviates from the standard chapter template beyond the pre-defined threshold, the method comprises notifying the one or more users and saving the updated chapter template as a new chapter template for the one or more workflows. A system for generating workflow templates for workflow applications is also disclosed.

20 Claims, 11 Drawing Sheets

METHOD AND SYSTEM FOR GENERATING TEMPLATES FOR WORKFLOW APPLICATIONS

TECHNICAL FIELD

Embodiments of the present disclosure generally relate to workflow management of enterprises or organizations. Particularly, the present disclosure relates to a method and system for generating templates for workflows associated with operations of a business enterprise.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Business enterprises or organizations may typically handle large amounts of data and information for planning and managing their business operations. Each enterprise may implement various business processes to manage their day-to-day operations and to achieve certain business goals or outcomes. Such business processes may typically involve a series of workflows to complete a particular business process or task. Each workflow may be a sequence of steps or actions that happen between the beginning and end of any task and carried out in a specific order by users of the enterprise to complete the task. For example, the workflows may require various users with different roles performing specific tasks like configuration, data analysis, project management, administrative tasks, approvals, executive responsibilities etc. The workflows may define how work moves through an organization across various departments or from one employee to another employee or from one team member to another team member. The complexity of the workflows for completing one or more tasks may vary based upon the type of industry, size of the enterprise, and/or products or services that the industry caters to.

Any business enterprises may have thousands of users or employees who may utilize various workflow applications for managing business operations. These workflow applications may serve, for example various purposes in the Pharma, Life Sciences, Bio Tech, Med Devices industry. Some non-limiting examples of such workflow applications may include Annual Product Quality Review, Quality System Management Review, Product Recall, Knowledge Management Review, Design Control, regulatory compliance, supply chain problems, etc.

As businesses evolve, the volume of data and information that needs to be handled increases manifold so does the complexity of the workflows associated with the execution of tasks. For example, for large business enterprises, the data that is manipulated is real-time, is voluminous and there is also a rapid rate of change of data. Therefore, workflows applications for different tasks or business processes of the enterprises need to be managed effectively so that the tasks are executed consistently and efficiently without bottlenecks, delays and errors and with improved efficiency.

Workflow management thus becomes an important and integral process for streamlining the day-to-day business operations. Since most of the workflow applications provide a visual interface for different user roles to manipulate the data based on the responsibility or roles in a particular department in an organization, there is a need to provide a flexible approach to layout the content as per their business requirements, at the same time a recommended consistency is also required so that the workflows generated for a particular year does not look completely different from another year to a customer.

Accordingly, there is a need for technical solutions to address the technical problems discussed above, and other inefficiencies of the prior arts. Particularly, there is a need to provide a seamless user interface for manipulating the data.

The legacy approaches fail to provide efficient techniques for managing workflow applications of business enterprises by providing structured workflow templates, that not only enhances the operational efficiency of the business process but also provides enhanced scalability and flexibility.

Applicant has identified many technical challenges and difficulties associated with current solutions and through applied effort, ingenuity, and innovation, the applicant has provided a solution to the above-mentioned drawbacks.

SUMMARY OF THE INVENTION

In general, embodiments of the present disclosure relate to managing workflow applications of business enterprises or organizations. Other implementations will be, or will become, apparent to one with skill in the art upon examination of the following figures and detailed description. It is intended that all such additional implementations be included within this description be within the scope of the disclosure and be protected within the scope of the following claims.

The present disclosure provides techniques for managing workflow applications in business enterprises by providing structured workflow templates. In an embodiment, techniques are provided for generating consistent workflow templates when users perform tasks associated with a business process. One or more users of an enterprise may select a workflow to be performed. Each enterprise's data may include multiple products based on different categories of data and indexing is created for each enterprise's data and its products. For example, each enterprise has a tenant index and further indexes such as product indexes, Department indexes, Chapter Indexes may be created based on enterprise requirements. The Chapter index may represent attributes relating to operating status such as manufacturing, trial phase, research phase etc. The present disclosure provides workflow templates to be auto generated or auto suggested to the user to maintain a consistency in the workflow process. The disclosure provides a method and system that enables selection of a layout template and a chapter template associated with a business process. The user further completes the workflow by adding supplementary data or content to the selected chapter template. The chapter template that is updated by the user may be compared with a standard chapter template to record deviations. In case of the deviation exceeding a threshold limit, the user is alerted. The user then saves the updated chapter template as the new chapter template for future use. The method and system disclose enables consistency in the workflow process and provides a standardized framework while navigating through workflows.

In one embodiment, the present disclosure provides a method for generating templates for a workflow application. The method comprises selecting a workflow to be performed by one or more users. The method further comprises selecting a layout template comprising one or more user-interactive objects. The method further comprises selecting a chapter template associating the one or more user-interactive objects to data to be rendered on the selected layout template, wherein the data and the one or more user-interactive objects are associated with the one or more workflows selected by the one or more users. The method further comprises updating the chapter template by adding supplementary data to complete the one or more workflows and determining if the updated chapter template deviates from a standard chapter template beyond a pre-defined threshold, wherein the standard chapter template is a stored baseline template. In response to determining that the updated chapter template deviates from the standard chapter template beyond the pre-defined threshold, the method comprises notifying the one or more users and saving the updated chapter template as a new chapter template for the one or more workflows.

In another embodiment, the present disclosure provides a system for generating templates for a workflow application, the system comprising a processor and a memory storing program instructions which, when executed by the processor, causes the processor to select a workflow to be performed by one or more users. The processor is configured to select a layout template comprising one or more user-interactive objects and select a chapter template associating the one or more user-interactive objects to data to be rendered on the selected layout template, wherein the data and the one or more user-interactive objects are associated with the one or more workflows selected by the one or more users. The processor is further configured to update the chapter template by adding supplementary data to complete the one or more workflows. The processor is further configured to determine if the updated chapter template deviates from a standard chapter template beyond a pre-defined threshold, wherein the standard chapter template is a stored baseline template. In response to determining that the updated chapter template deviates from the standard chapter template beyond the pre-defined threshold, the processor is configured to notify the one or more users and save the updated chapter template as a new chapter template for the one or more workflows.

In yet another embodiment, the present disclosure provides a non-transitory computer-readable storage medium, storing program instructions executed by a processor to for generating templates for a workflow application. The program instructions when executed by the processor, selects a workflow to be performed by one or more users. The program instructions when executed by the processor, selects a layout template comprising one or more user-interactive objects and selects a chapter template associating the one or more user-interactive objects to data to be rendered on the selected layout template, wherein the data and the one or more user-interactive objects are associated with the one or more workflows selected by the one or more users. The program instructions executed by the processor, updates the chapter template by adding supplementary data to complete the one or more workflows and determines if the updated chapter template deviates from a standard chapter template beyond a pre-defined threshold, wherein the standard chapter template is a stored baseline template. In response to determining that the updated chapter template deviates from the standard chapter template beyond the pre-defined threshold, the program instructions executed by the processor notifies the one or more users and saves the updated chapter template as a new chapter template for the one or more workflows.

The above summary is provided merely for the purpose of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE DRAWINGS

Figure 1:
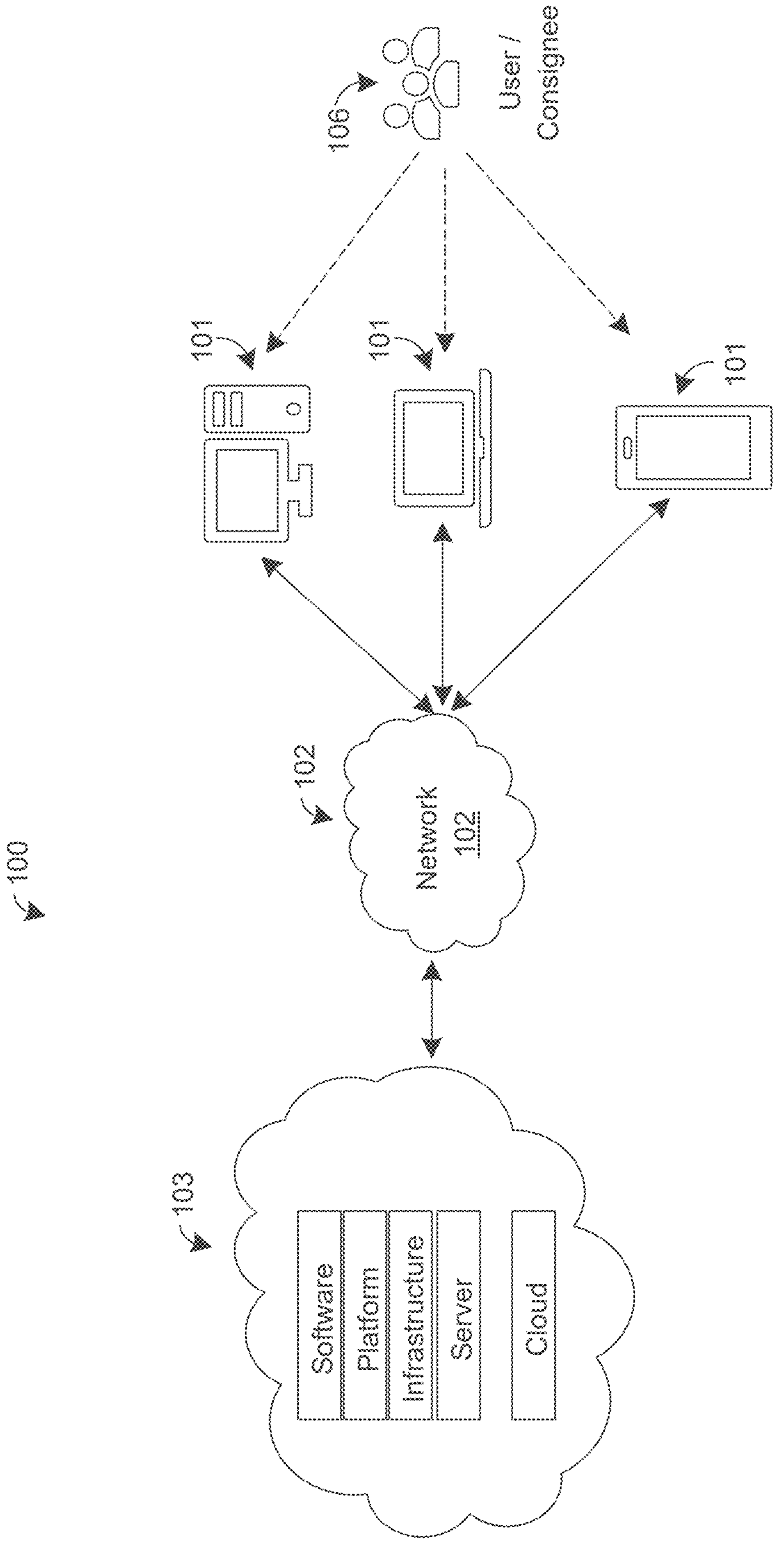
Figure 2:
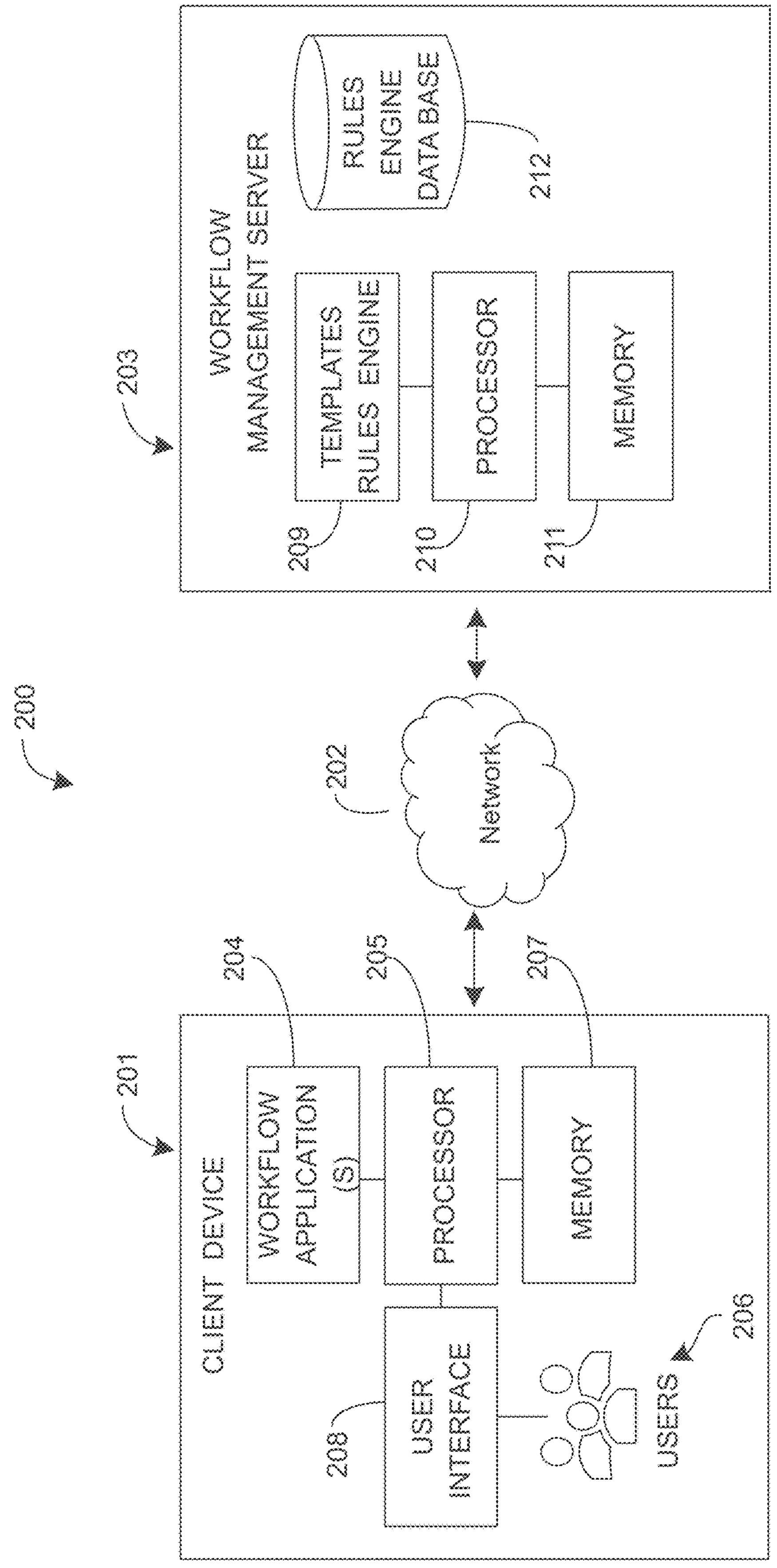
Figure 3:
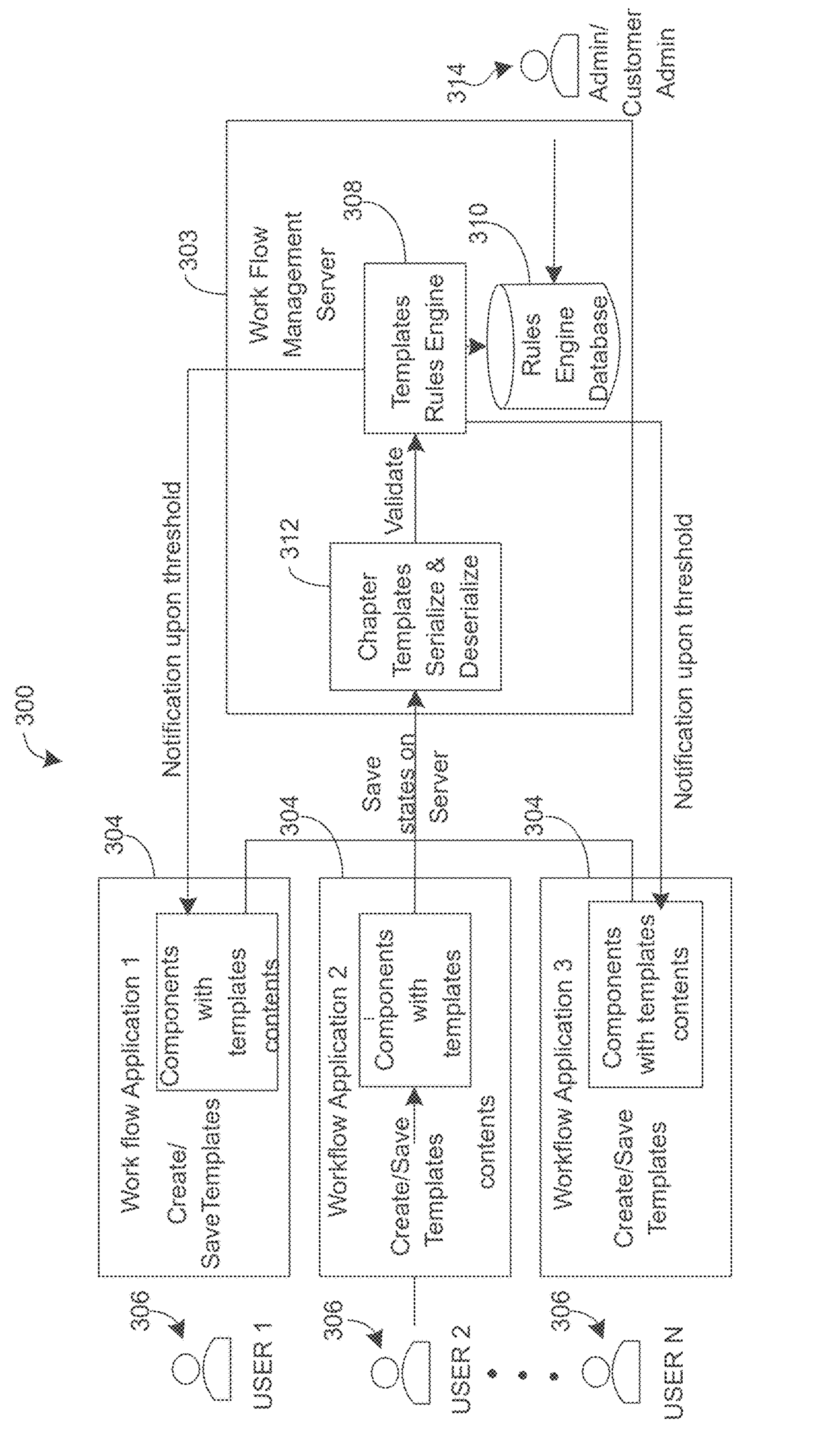
Figure 4:
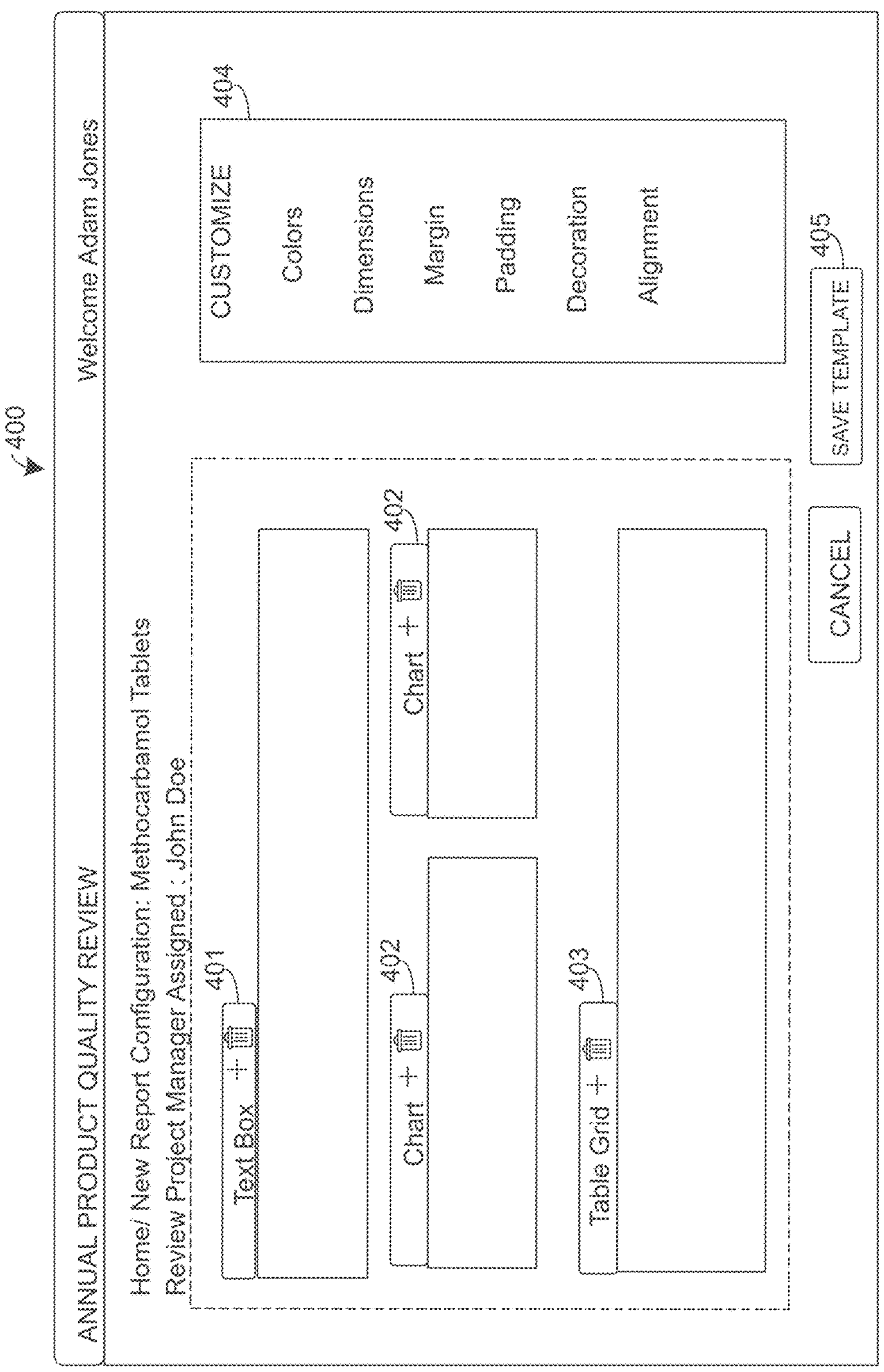
Figure 5:
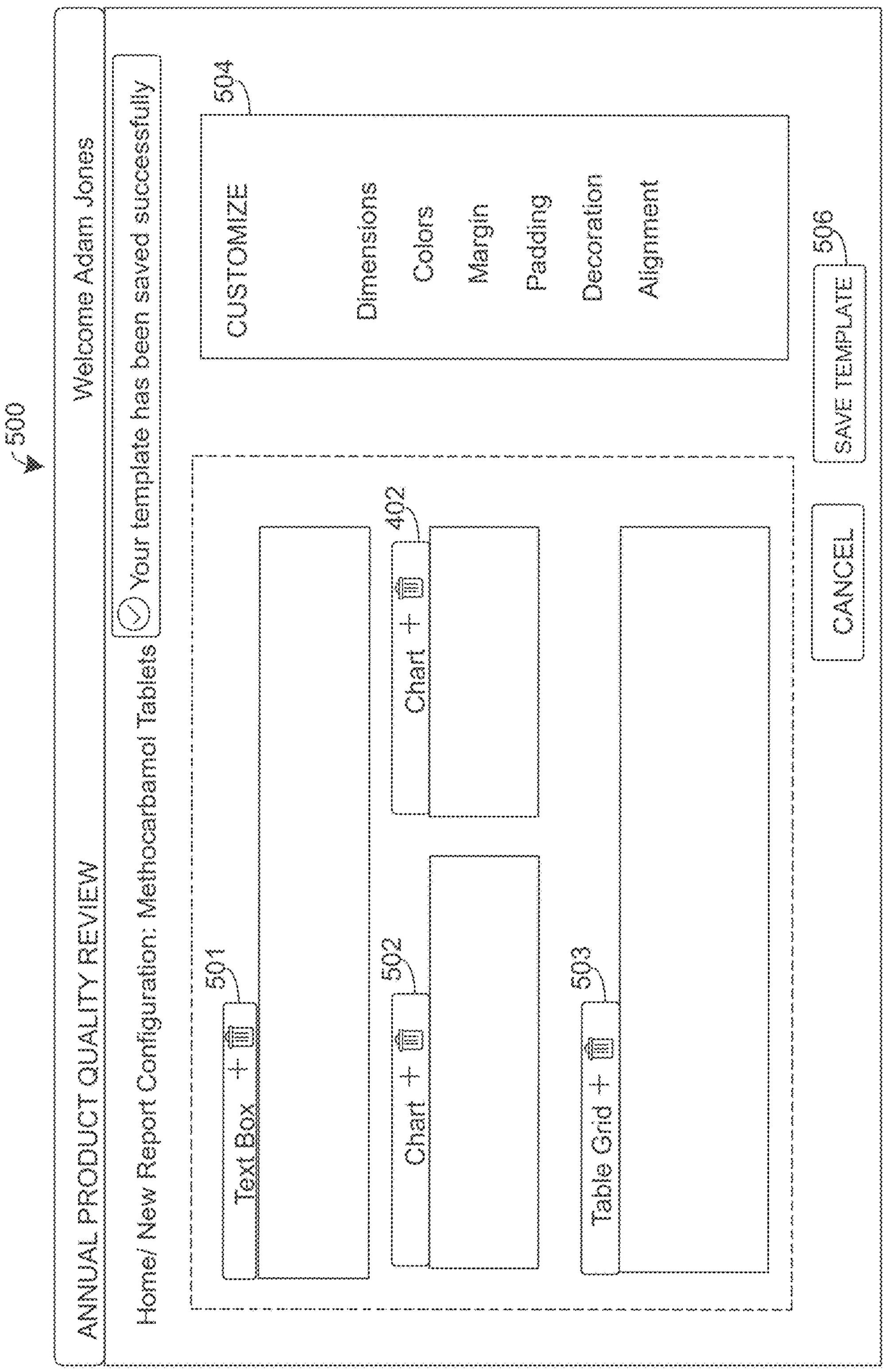
Figure 6:
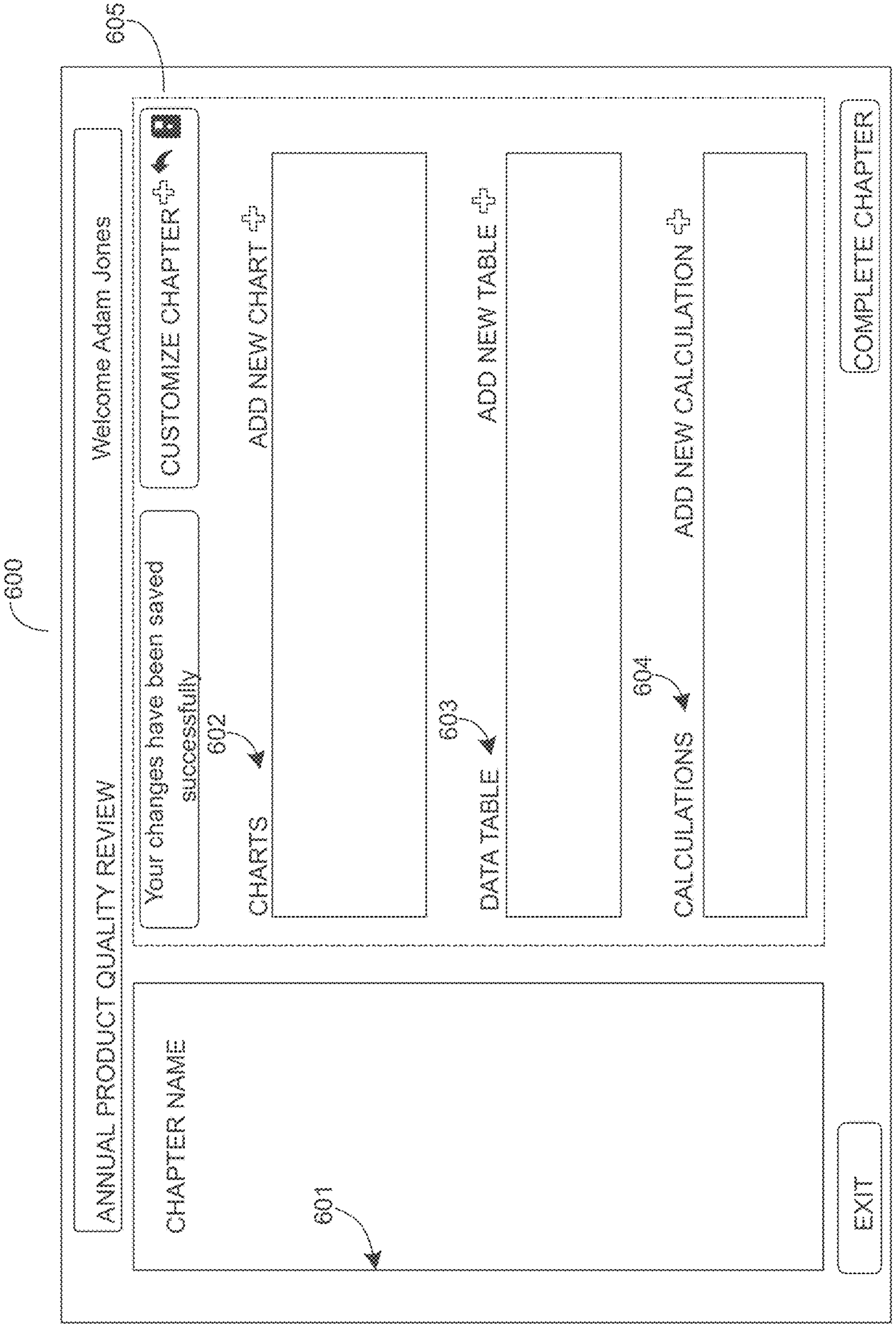
Figure 7:
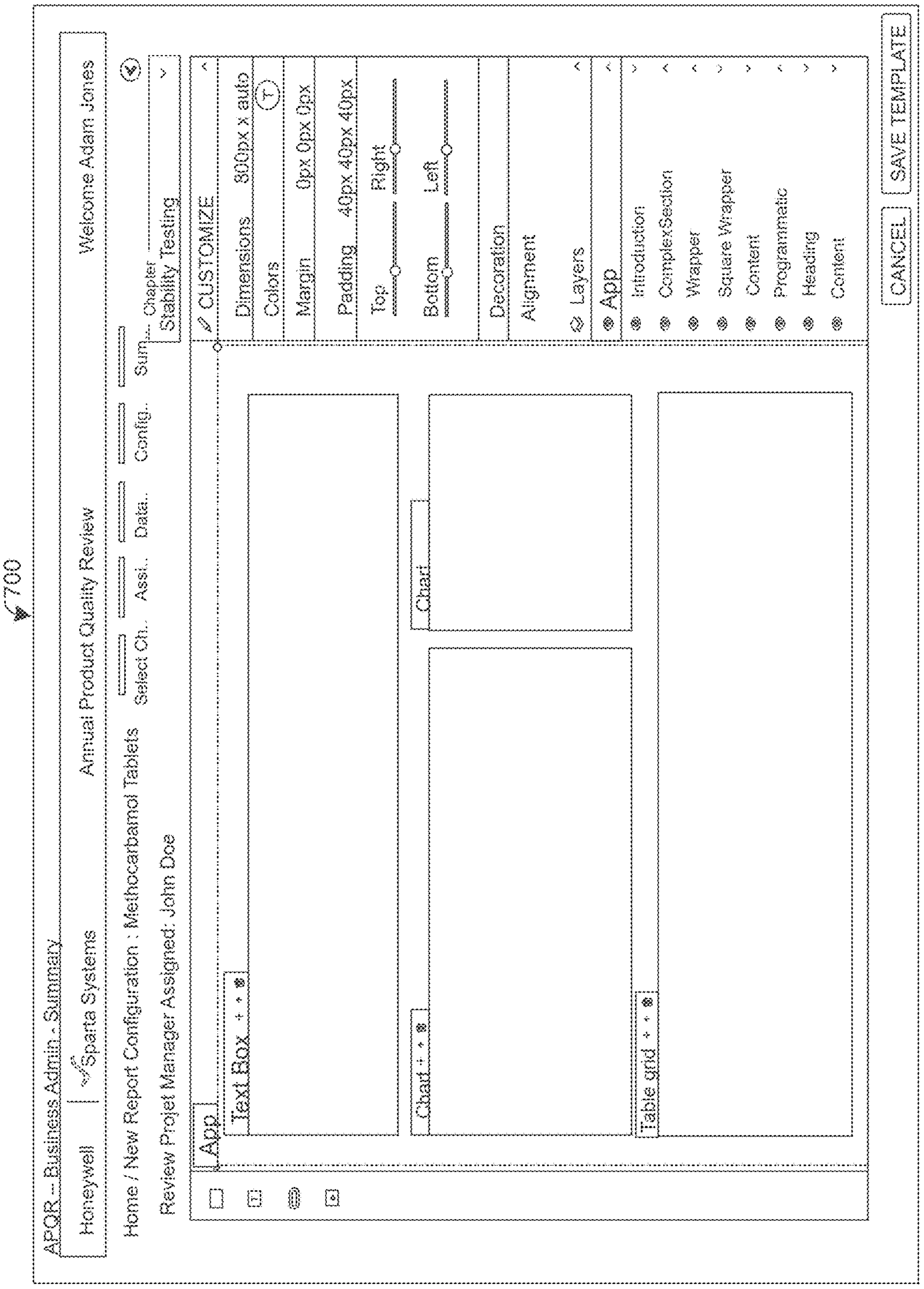
Figure 8:
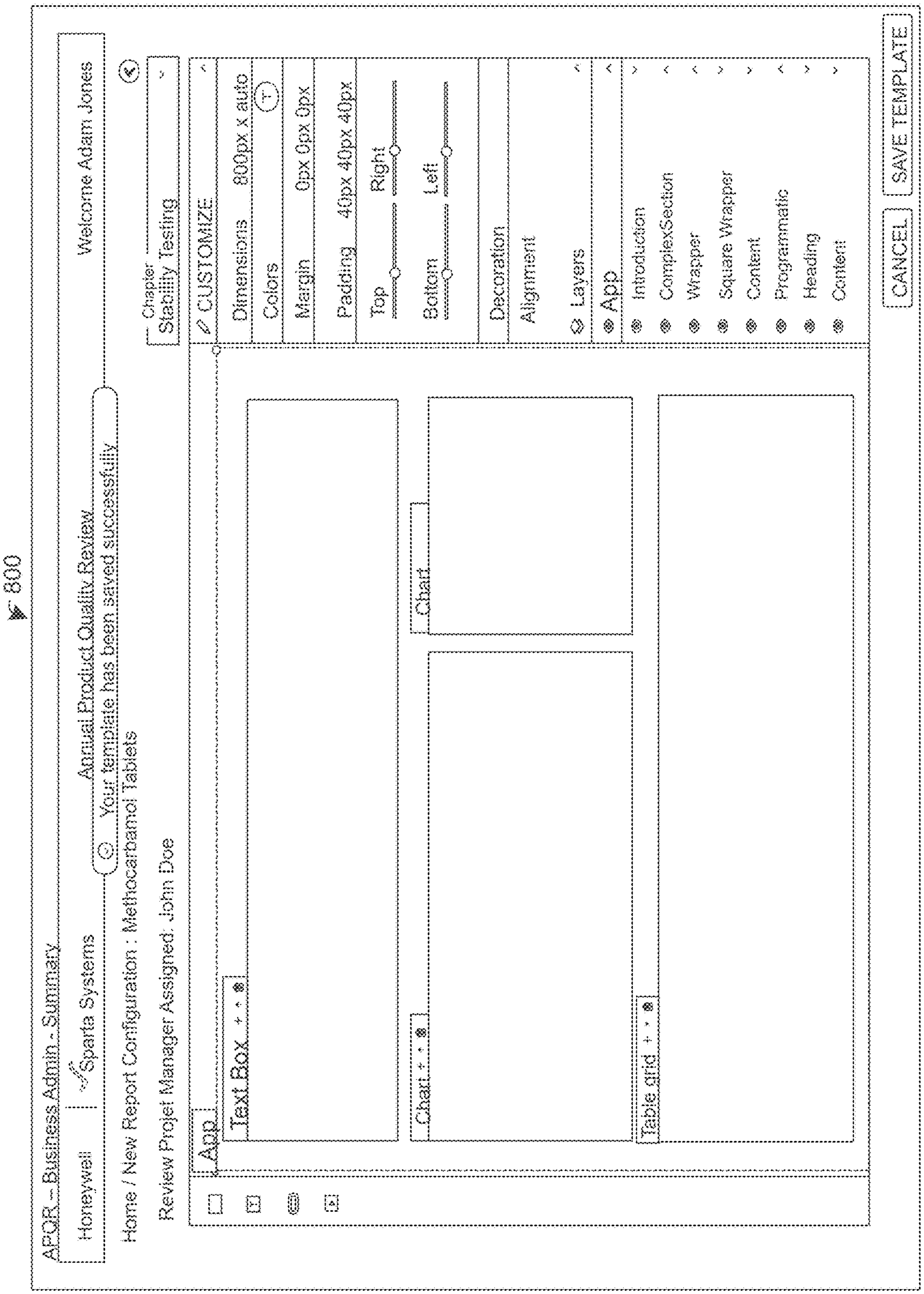
Figure 9:
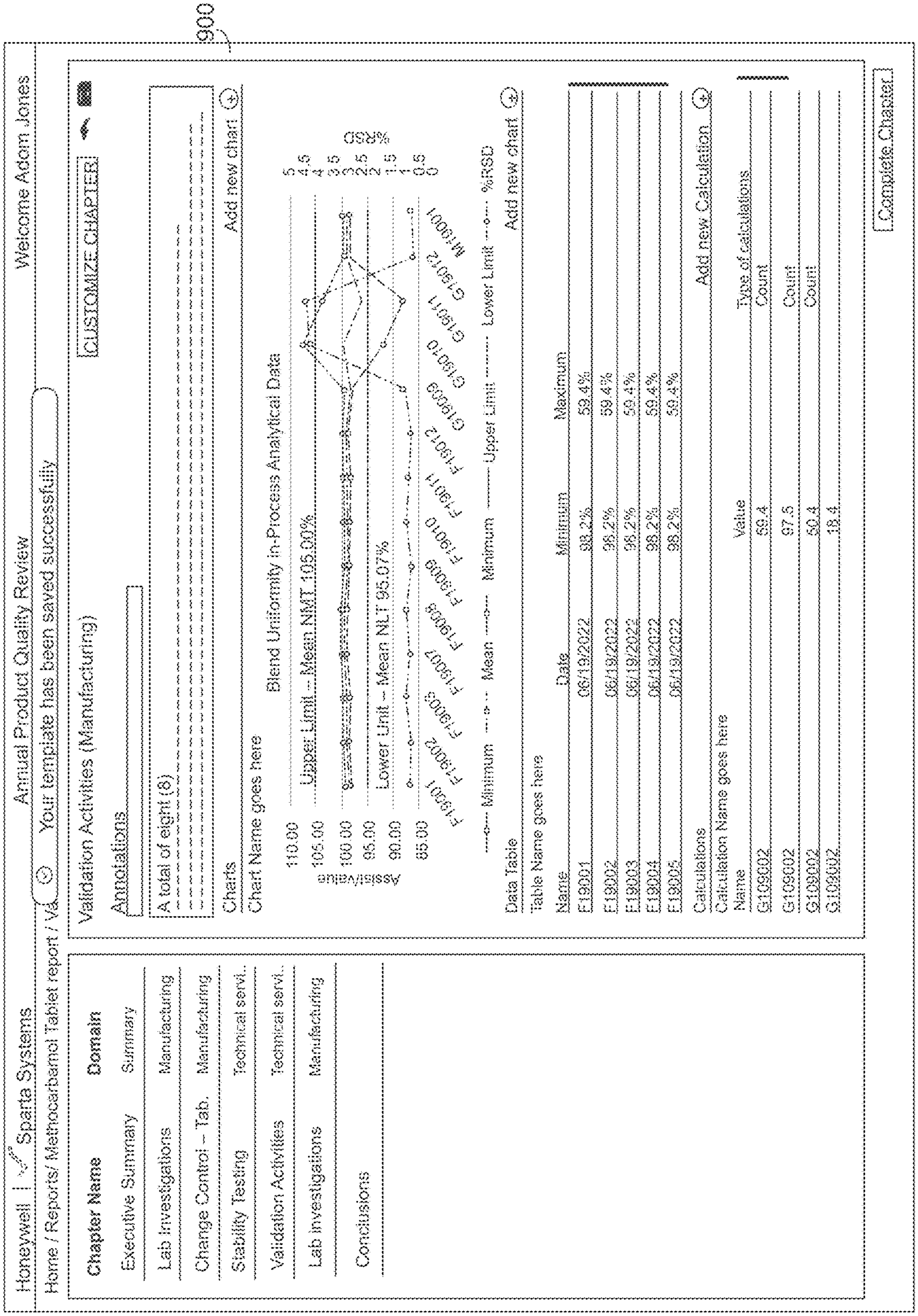
Figure 10:
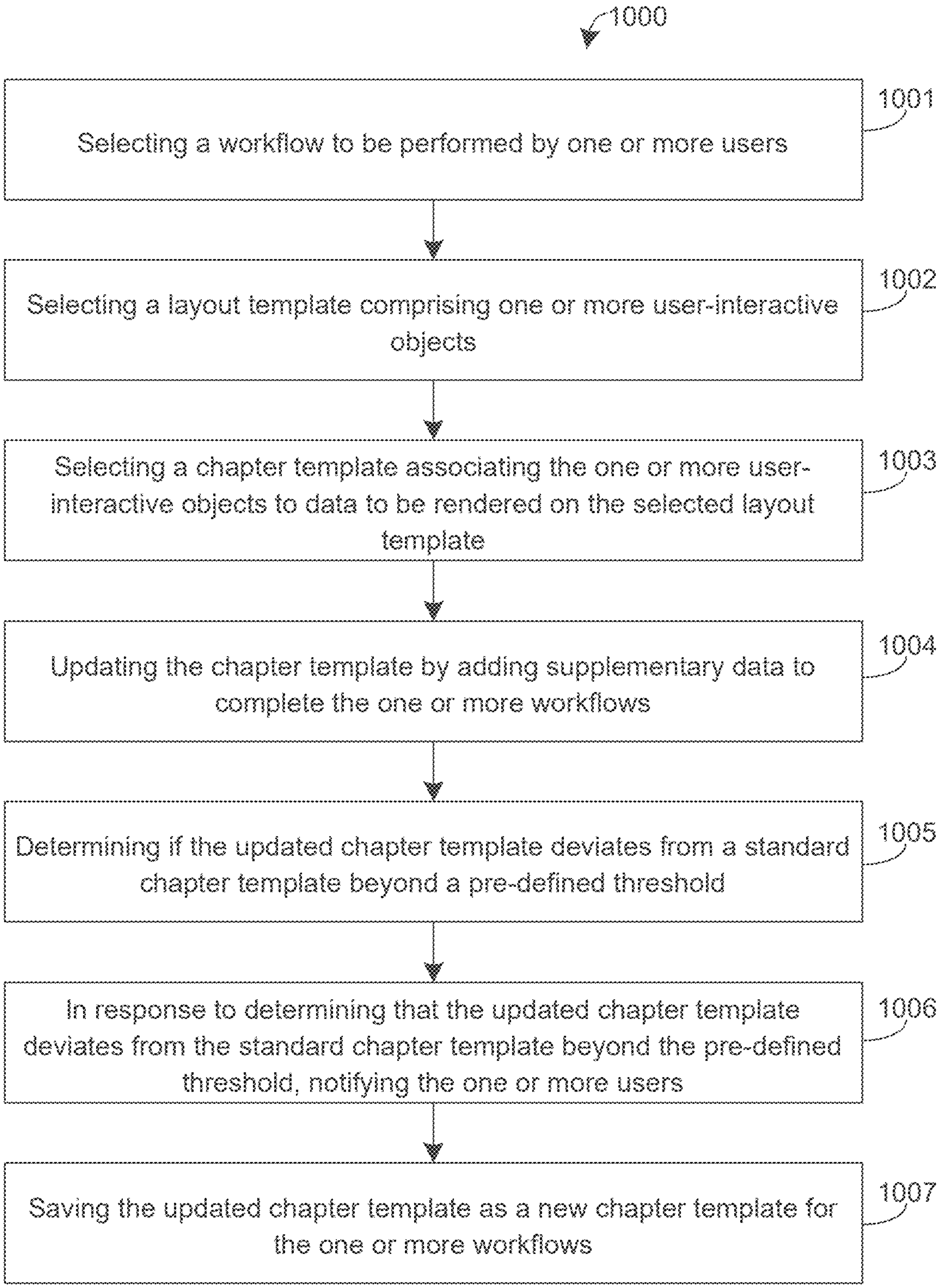
Figure 11:
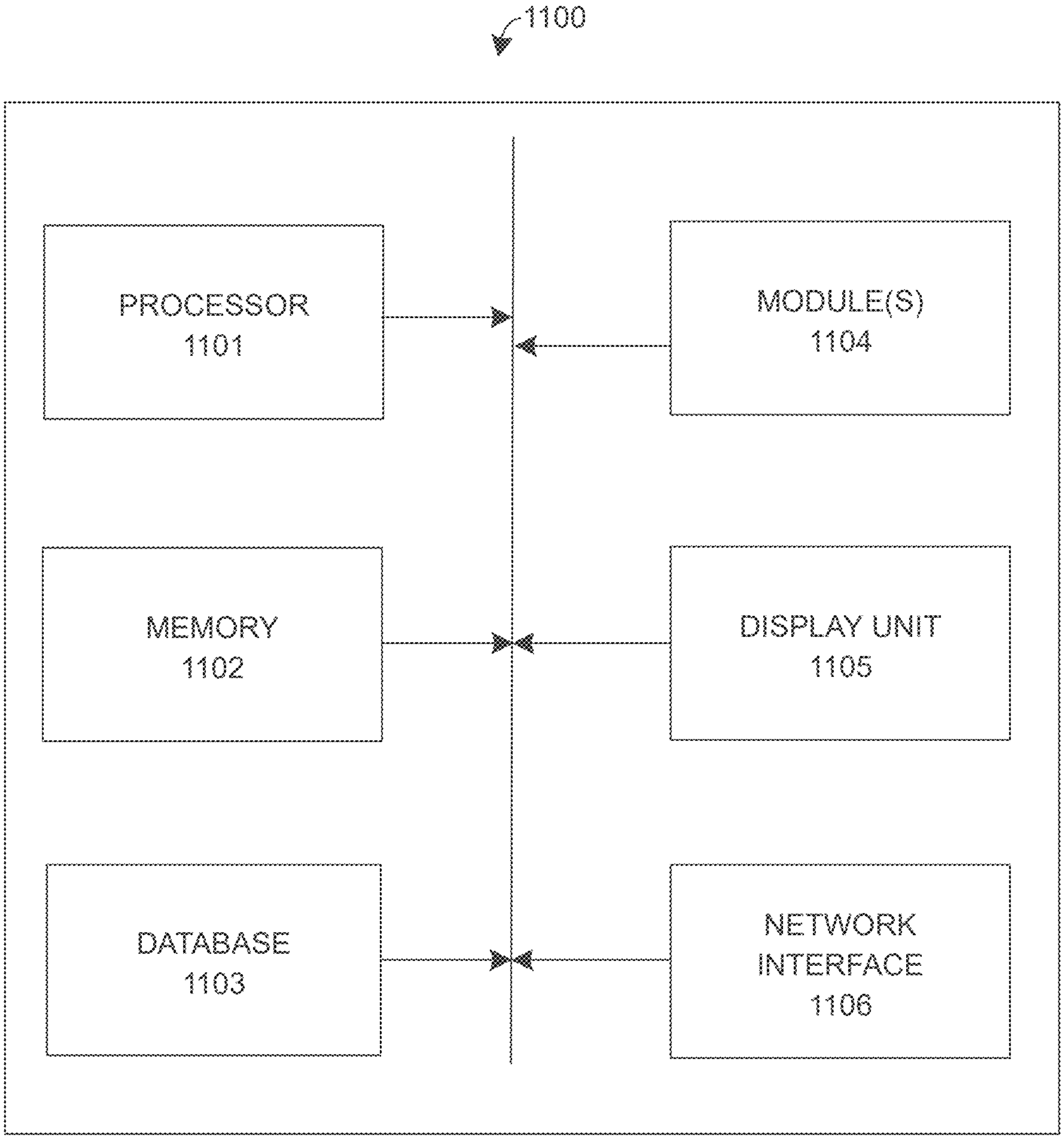

Having thus described the embodiments of the disclosure in general terms, reference now will be made to the accompanying drawings, which are not necessarily drawn to scale, and wherein:

FIG. 1 illustrates an exemplary block diagram of an environment in which embodiments of the present disclosure may operate;

FIG. 2 illustrates an exemplary block diagram of a system for generating templates for workflow applications in accordance with one or more embodiments described herein;

FIG. 3 illustrates another exemplary block diagram of a system for generating templates for workflow applications in accordance with one or more embodiments described herein;

FIGS. 4 and 5 illustrate an exemplary diagram of template generated for workflow applications in accordance with one or more embodiments described herein;

FIG. 6 illustrates another exemplary diagram of template generated for workflow applications in accordance with one or more embodiments described herein;

FIGS. 7-9 show screenshots of a user interface depicting template generation for workflow applications in accordance with one or more embodiments described herein;

FIG. 10 illustrates a flow diagram of a method for generating templates for workflow applications in accordance with one or more embodiments described herein;

FIG. 11 illustrates a general block diagram of a computing system, in accordance with one or more embodiments described herein.

DETAILED DESCRIPTION

Some embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

Typically, business enterprises implement various business processes for collecting and managing data and information required for the particular enterprise. A series of tasks or business processes may be performed by the organization or enterprise to achieve a business goal or outcome. The various internal processes can include designing, monitoring and controlling product design processes, production processes, manufacturing processes, sales processes and the like. Such business processes or tasks may typically involve a series of workflows to complete the particular task. Each workflow may be a sequence of steps or actions that happen between the beginning and end of any task and carried out in a specific order by users of the enterprise to complete the task. For example, there may be thousands of users (customers, partners, clients, employees) who may perform various tasks related to business operations.

One or more enterprises may be involved in manufacturing and distribution of one or more products and the products may include but not limited to healthcare related products including medical devices, medicines, therapeutic compositions. Workflow applications in a manufacturing unit of an enterprise may, for example include annual product quality review, quality management review, recalling of faulty products, quality control issues, supply chain problems, regulatory compliance, knowledge management review, design control etc. Other examples may include but not limited to intelligent audit planning, emergency response systems, among others. In the case of a workflow for intelligent audit planning, the attributes may be documents, signature forms, processes, and regulatory procedures. In the case of a workflow for manufacturing, the attributes may be delivery of products, product recall, failure of product meeting inventory among others. The workflows for these tasks require various users with different roles performing specific tasks like configuration, data analysis, project management, administrative tasks, approvals, executive responsibilities, etc.

The complexity of the workflows for completing one or more tasks may vary based upon the type of industry, size of the enterprise, and/or products or services that the industry caters to. In one instance, workflow may define steps or actions associated with performing a task, such as producing an item or delivering an item, and may identify the employees that may perform these tasks. In another instance, some complex workflow steps may include configuration of data sources, object models, chart configurations, table configurations, calculation configurations and the like. Therefore, when such complex workflows are navigated in real-time by thousands of users and clients by utilizing workflow applications in an enterprise setting, a consistent and flexible approach is required in the workflow process, by providing structured and consistent workflow process templates.

To improve the overall performance of the system in an enterprise setting that manipulates large amounts of data, workflow process templates are essential to improve productivity and avoid errors. For example, business processes may involve order processing, customer service, among others which may include a series of activities to be completed in a specific order along with roles and responsibilities for each user. Therefore, a standardized workflow template may be useful in order to streamline the workflows, remove inconsistencies and improve efficiency.

Accordingly, there is a need to provide a standardized framework that is flexible and is adaptable to evolving business requirements, making it easy for the users to navigate through the internal business processes within an enterprise.

There is also a need to provide a method and system for generating workflow templates to manage business operations with an aim to provide improved flexibility, scalability, efficiency of the business enterprises.

Accordingly, the present disclosure provides a method and system for managing and streamlining business processes in an enterprise. Particularly, the present disclosure provides a method and system for generating templates for workflow applications for users in a business enterprise.

FIG. 1 illustrates an exemplary block diagram of an environment 100, in which the embodiments of the present disclosure may operate. Specifically, FIG. 1 illustrates a plurality of client devices 101. In an embodiment, the plurality of client devices 101 may be in operative communication with a cloud environment 103 over a network 102. In one or more embodiments, the one or more client devices 101 is integrated within or corresponds to a mobile computing device, a smartphone, a tablet computer, a mobile computer, a desktop computer, a laptop computer, a workstation computer, a wearable device, a virtual reality device, an augmented reality device, or another type of remote computing device. Although exemplary system 100 is shown with three client devices 101, any number of client devices may be supported.

In an embodiment, the plurality of client devices 101 may be operable by one or more users or clients 106 of an enterprise to manage the workflow of one or more tasks associated with a business operation typically to achieve a particular business goal or objective. The users 106 may utilize a plurality of workflow applications to complete one or more workflows associated with a particular business operation or service. For example, enterprises may be involved in manufacturing and distribution of one or products, and the products may include but not limited to healthcare related products including medical devices, medicines, therapeutic compositions. Workflow applications of an enterprise in a non-limiting example may include annual product quality review, quality management review, recalling of faulty products, quality control issues, supply chain problems, regulatory compliance, etc. The workflows may require various users with different roles performing specific tasks like configuration, data analysis, project management, administrative tasks, approvals, executive responsibilities, etc.

According to various embodiments, a network 102 may be configured to provide communication between various components depicted in FIG. 1. In some embodiments, the network 102 may include a public network (e.g., the Internet), (e.g., an internal localized, or closed-off network between particular devices). In some other embodiments, the network 103 may be a hybrid network (e.g., a network enabling internal communications between particular connected devices and external communications with other devices). Such configuration(s) include, without limitation, a wired or wireless Personal Area Network (PAN), a Cloud network, Local Area Network (LAN), Metropolitan Area Network (MAN), Wide Area Network (WAN), and/or the like. In various embodiments, the network 102 may include one or more base station(s), relay(s), router(s), switch(es), routing station(s), and/or the like.

According to various embodiments, the cloud environment 103 may include one or more servers and may provide different types of cloud computing services including but not limited to one or more services provided under Software as a Service (SaaS) category, services provided under Platform as a Service (Pass) category, services provided under Infrastructure as a Service (IaaS), category. In some embodiments, the cloud environment 103 may also include serverless computing. In some embodiments, the cloud infrastructure is operated solely for an organization called the private cloud. In some embodiments, the cloud infrastructure is shared by several organizations called the community cloud. In some other embodiments, the cloud infrastructure is made available to the general public or a large industry group and is owned by an organization selling cloud services, called the public cloud. In some embodiments, the cloud infrastructure is a composition of two or more clouds (private, community, or public) that remain unique entities but are bound together by standardized or proprietary technology that enables data and application portability.

Embodiments of the present disclosure may provide for management of workflow applications by generating workflow templates for a multi-tenant cloud-based system. Embodiments of the present disclosure may manage applications and data both in the cloud and on-premise. Embodiments of the present disclosure may support multi-channel access via web, mobile, and application programming interfaces ("APIs"). Embodiments of the present disclosure may manage access for different users, such as customers, partners, and employees. Embodiments of the present disclosure may integrate with new and existing applications and identities.

Embodiments of the present disclosure may be based on a multi-tenant architecture for managing cloud-scale software services. Multi-tenancy refers to having one physical implementation of a service securely supporting multiple customers buying that service. A service is a software functionality or a set of software functionalities that can be reused by different clients for different purposes.

In an embodiment, the plurality of client devices 101 may be utilized by one or more clients or users 106 to connect to the cloud environment 103 via a secure communication channel over the network 102. The users 106 operating one or more client devices 101 may utilize a plurality of workflow applications to execute and complete the workflows.

FIG. 2 is an exemplary block diagram illustrating a system 200 for generating templates for workflow applications in accordance with one or more embodiments described herein. In an embodiment, the system 200 may comprise a workflow management server 203 for managing the workflows of various tasks executed by the employees of the organization to complete a business process. The workflow management server 203 may comprise a processor 210 communicably coupled to a memory 211. The processor 210 may store and execute instructions for implementing the functions of the workflow management server 203. In an embodiment, the workflow management server 203 may communicate via a communication interface with one or more client devices 201 over the network 202.

In an embodiment, the one or more users of a client device 206 may utilize workflow applications 204 for managing the workflows of various applications or services associated with business operations. For example, the users or employees of the business enterprise may utilize various workflow applications to execute and complete the workflows. The workflow applications 204 of an enterprise may in a non-limiting example include annual product quality review, quality management review, recalling of faulty products, quality control issues, supply chain problems, regulatory compliance, etc. The workflows for these tasks require various users with different roles performing specific tasks like configuration, data analysis, project management, administrative tasks, approvals, executive responsibilities, etc. The examples of workflows or tasks and workflow applications described above are provided for illustrative purposes only, and it is not intended that the present disclosure be limited to only these examples. The examples are provided merely to identify the type of workflows being analyzed. The present disclosure can also apply to other business and enterprise applications.

Since most of the workflow applications 204 provide a visual interface for different user roles to manipulate the content and data based on the responsibility or roles in a particular department in an organization, there is a need to provide a flexible and effective approach to layout the content as per their own requirements, at the same time a recommended consistency is also required so that the workflows generated for a particular year does not look completely different from another year. Therefore, embodiments of the present disclosure provide for generating templates for completing chained workflows and user roles. Embodiments of the present disclosure provide for generating workflow templates that standardizes the various business processes across an organization and also ensures consistency.

In an embodiment, the users of the enterprise 206 may utilize the workflow application(s) 204 of the client devices 201 for executing one or more tasks associated with the business operations. The workflow application(s) 204 enable the users to connect to the workflow management server 203 through a network 202 by providing authentication credentials through the user interface 208 of the or more client devices 201. Once the user is authenticated, the one or more users of the enterprise may connect to the workflow management server 203 using the one or more client devices 201. In an embodiment, the workflow management server 203 may be responsible for managing the workflows of various tasks executed by the users of the enterprise.

In an embodiment, the one or more client devices 201 may also include a memory 207 operatively coupled to the processor 205. In an embodiment, the users of the enterprise may utilize the workflow application(s) 204 of the client devices 201 for executing one or more tasks associated with the business operations. The workflow application(s) 202 enable the users to connect to the workflow management server 203 through a network 202 by providing authentication credentials through the user interface 208 of the or more client devices 201. Once the user is authenticated, the one or more users of the enterprise may connect to the workflow management server 203 using the one or more client devices 201.

In an embodiment, the workflow management server 203 may include a memory 211 operatively to the processor 210. The memory 211 may be non-transitory and may include, for example, one or more volatile and/or non-volatile memories. In some embodiments, the memory 211 includes or embodies an electronic storage device (e.g., a computer readable storage medium). In some embodiments, the memory 211 is configured to store information, data, content, applications, instructions, or the like, for enabling a system to carry out various operations and/or functions in accordance with example embodiments of the present disclosure.

In one or more embodiments, the system 200 may include one or more software modules or components to manage workflows in accordance with the one or more embodiments herein. In an embodiment, the workflows are managed and standardized by auto generating templates to complete the workflows associated with a business process. In an embodiment, the one or more software modules may include but not limited to the templates rules engine 209 which implements the functions of the workflow management server 203 through the processor 204. The templates rules engine 209 may define rules or threshold conditions based on which the templates for workflows may be generated, adjusted or updated and used for completion of the workflows. In an embodiment, the rules engine database 212 may store the rules for defining the threshold conditions for maintaining consistency in the generation of templates. In one embodiment, the database 212 may be cloud-based database. In another embodiment, the one or more databases may be a localized database.

In one preferred embodiment, the system 100, 200 of the present disclosure may be configured as a cloud-based system. In various embodiments, the cloud environment 103 may be configured to run one or more services or software applications provided by one or more components of the system 200. In some embodiments, the services may be offered as web-based or cloud-based services to the users of the client devices 201. In another embodiment, one or more of the components of system 200 and/or the services provided by the components may also be implemented by one or more client devices 201. Users operating the client devices 201 may utilize one or more client applications to use the services provided by the components of the system 200.

In an embodiment, one or more modules (not shown) of the system 100, 200 may be implemented using electronic hardware, computer software, or any combination thereof. Whether such elements are implemented as hardware or software depends upon the application and design constraints imposed on the overall system. Examples of the systems may include computing systems (e.g., servers, datacenters, desktop computers, Internet of Things devices, etc.) and mobile computing systems (e.g., laptops, cell phones, etc.). Although components are described with respect to functional limitations, it should be understood that the particular implementations necessarily include the use of particular computing hardware. It should also be understood that in some embodiments certain of the components described herein include similar or common hardware.

The functions of the templates rules engine 209 and the workflow management server of FIG. 2 are described in greater detail in FIG. 3. The templates rules engine 209, in one or more embodiments is a chapter templates rules engine 308, in accordance with the embodiments of the present disclosure described in detail in FIG. 3.

FIG. 3 illustrates another exemplary block diagram of a system 300 for generating templates for workflow applications in accordance with one or more embodiments described herein. In an embodiment, the system 300 may include a plurality of workflow applications 304 which are utilized by the users 306 of an enterprise to complete one or more workflows associated with a particular business process. The workflow applications 304 of an enterprise may in a non-limiting example include annual product quality review, quality management review, recalling of faulty products, quality control issues, supply chain problems, regulatory compliance, etc. The workflows for these tasks require various users with different roles performing specific tasks like configuration, data analysis, project management, administrative tasks, approvals, executive responsibilities, etc.

As most of the workflow applications 304 provide a visual interface for different user roles to manipulate the content and data based on the responsibility or roles in a particular department in an organization, there is a need to provide a flexible and standardized approach to layout the content as per their own requirements, at the same time a recommended consistency is also required so that the completed workflows for a particular year does not look completely different from another year for a customer. Therefore, the present disclosure provides techniques for maintaining a level of consistency when the users complete the workflows by auto suggesting templates in a phased manner while navigating the workflow applications.

In an embodiment, the system 300 may comprise a workflow management server 303. In some embodiments, the workflow management server 303 may include a chapter templates rules engine 308 and a rules engine database 310. In an embodiment, the one or more users 306 of an enterprise may select a particular workflow to be performed using the workflow applications 304. For example, the user 306 may want to generate a report for annual product quality review in a particular enterprise. Upon login, the system 300 enables the user 306 to select a layout template for generating the report comprising one or more user-interactive objects. In an embodiment, the one or more user-interactive objects may comprise user elements like text controls, chart controls, media controls, table controls, Business Intelligence (BI) tools controls etc. for completing the report generation. The selection of layout template comprising the user elements may be phase 1 of the template generation where only layout for generating the report is enabled by the system. In an embodiment, the system 300 enables the user to save the selected layout template as a JSON. In an embodiment, the layout template saved as a JSON can be serialized and saved on the workflow management server 303 and retrieved by deserializing for future use.

Each enterprise's data may include multiple products based on different categories of data and indexing is created for each enterprise's data and its products. For example, each enterprise has a tenant index and further indexes such as product indexes, Department indexes, Chapter Indexes may be created based on enterprise requirements. The tenant index represents attributes representing an enterprise. The product index represents attributes representing one or more characteristics of the product. The Department index represents attributes of the relevant department pertaining to one or more products. The Chapter index may represent attributes relating to operating status such as manufacturing, trial phase, research phase etc.

In an embodiment, the system 300 enables the user 306 to select a chapter template associating the one or more user-interactive objects to data or content to be rendered on the selected layout template for the selected workflow. The data and the one or more user-interactive objects are associated with the one or more workflows selected by the one or more users. In an embodiment, the selection of chapter template on the selected layout template by the user 306 may be phase 2 of the template generation process. For example, in phase 2 of the template generation, the user elements are associated with specific identifiers, like the content for table to be rendered by processing of a backend calculation that will happen in future, configuring the content of a chart user element to be rendered by processing of a dataset and associated server processing at some point in the future. In phase 2 of the template generation, the association between the user elements and the content to be rendered is set, with links to the actual content. In this phase of template generation, the actual content is not filled in the template, as the report generation is not initiated. In an embodiment, the system 300 enables saving of the selected chapter template as a JSON for future use.

In an embodiment, the user 306 may update the chapter template by adding supplementary data to complete the one or more workflows, for example report generation in annual product quality review. For example, the department user may use the saved template and add some supplementary data or content, for example, based on the domain knowledge-based analysis, annotations, additional supplementary content like additional charts etc. and update the chapter template in the process. In an embodiment, the chapter templates rules engine 308 of the workflow management server 303 may determine if the updated chapter template exceeds certain threshold limits set by, for example the business administrator of the enterprise, and actions to be taken upon reaching those thresholds. The chapter templates rules engine 308 may determine if the updated chapter template deviates from a standard chapter template beyond a pre-defined threshold. In an embodiment, the standard chapter template may be a baseline template stored on the server workflow management server 303 based on previous iterations of the workflow and previously approved chapter templates for the user. For example, the chapter templates that are updated by the user 306 may be saved in the workflow management server 303 and validated to determine if the updated chapter template deviates from a certain threshold limit. In some embodiments, the threshold limits are defined based on previously approved chapter templates in previous iterations of the workflow. In an embodiment, the rules engine database 310 may store the rules for defining threshold limits based on which the deviations of the updated chapter templates from approved chapter templates are recorded.

In an embodiment, in response to determining that the updated chapter template deviates from the standard chapter template beyond the pre-defined threshold, the one or more users are notified of the deviation by the chapter templates rules engine 308. For example, a user 306 has updated a chapter template for report generation which indicates a marked deviation from previously approved reports, then the user is notified of such deviation. For example, the rules for defining the threshold limits can be calculated based on counting the difference in the content of the JSON fields of the template JSONs which are current and which are stored historically. In an example, the threshold limits can be set based on the difference in the JSON fields between the updated chapter template JSON and the standard template JSON, which is the baseline template. If the difference in the JSON fields of the template JSONs exceeds a certain threshold limit, the chapter templates rules engine 308 may trigger a notification to the user 306 alerting of the deviation. The updated chapter template is then saved as a new chapter template for future use for the workflows.

For example, to stay compliant with approved reports templates, if the deviation of a particular chapter template from its previously approved chapter templates is greater than a certain level (for example between 25-75% depending upon business requirements), the chapter templates rules engine 308 may notify the user 306, where percentage of deviation could be based on counting the difference in content of JSON fields of various nodes in the template JSONs. In an example, the percentage of deviation may be calculated by: (No of Total Common JSON Fields in current template compared to standard Template-No of JSON fields with different values)/No of Total Common JSON Fields in current template compared to standard Template*100>75%.

According to an embodiment, the auto suggestion of templates and the recording of deviations enables the system 300 to track the volume of changes made by the one or more users 306 while completing a particular workflow. In some embodiments, the system 300 also enables tracking the volume of changes made at each chapter level, section and subsection level. In some embodiments, the deviations of chapter templates from previously approved templates for a particular product can be tracked. In some embodiments, the deviations of chapter templates from standard templates can be tracked. In some embodiments, by tracking of template changes per user role level, chapter level, section level and subsection level, it may be determined that the overall workflows need to be refined and the workflows may be optimized by compressing the screens where the template changes are minimal or non-existent. The tracking of changes made to the templates enables collection of data to provide recommendations in real time and to provide seamless and consistent workflow process.

In another example, if the attributes of certain chapter templates have similarity to each other, the similarity may be determined by reaching a configured threshold of nodes fields that have similar attributes, then for future workflows, the chapter templates may be auto populated if the chapter templates were not automatically saved. For example, if it was determined that the chapter template for “Critical Process” chapter has 80% similarity to “Deviations” chapter historically even when the chapter templates changed, then when the report is generated, and “Critical Process” chapter is configured first then the “Deviations” chapter may adjust its landing template to resemble the layout. By comparing the JSON’s of the chapter templates, it may be easy to determine which queries, charts, visuals are shared amongst the various templates at chapter template level and consistency can be maintained.

FIGS. 4 and 5 illustrate an exemplary diagram of template selection for workflow applications in accordance with one or more embodiments described herein. Specifically, FIG. 4 is an exemplary layout template 400 for use in a workflow application. In an embodiment, the user may select a particular workflow associated with a business process, such as annual product quality review. In an exemplary embodiment, when the workflow is selected, the system enables the user to select a template as shown in FIG. 4, which for example is the layout for the workflow. The layout template 400 selection, for example is phase 1 of the template generation process. In the exemplary illustration of FIG. 4, the template is generated for annual product quality review for methocarbamol tablets. In an embodiment, the system enables saving 405 of the selected layout template in a serialized state as a JSON.

In an embodiment, the selection of chapter template on the selected layout template may be phase 2 of the template generation process. For example, in phase 2 of the template generation, the user elements like charts, text box, table grid are associated with specific identifiers, like the content for table to be rendered by processing of a backend calculation that will happen in future, configuring the content of a chart user element to be rendered by processing of a dataset and associated server processing at some point in the future. In an embodiment, the system 300 enables saving 506 of the selected chapter template as a JSON for future use. As can be seen in FIGS. 4 and 5, the templates 400, 500 may comprise one or more user elements like text box 401, 501 chart 402, 502, table grid 403, 503 etc. which are associated with content to be rendered. In phase 2 of the template generation, the association between the user elements and the content to be rendered is set, with links to the actual content. In this phase of template generation, the actual content is not filled in the template, as the report generation is not initiated.

FIG. 6 illustrates another exemplary diagram of the chapter template for workflow applications in accordance with one or more embodiments described herein. Specifically, FIG. 6 depicts how the content for annual quality review for the workflow application is populated on the selected template 500 of FIG. 5. For example, when annual quality review report is generated, the department user or content owners may use same template 500 and proceed to add supplemental content to this template, for example their domain knowledge-based analysis, annotations, additional supplementary content like additional charts etc. For instance, charts 602, data table 603, calculations 604 may be populated on the chosen chapter template by adding supplemental content to complete the workflow. In an embodiment, additional content may be added with add new chart, add new table and add new calculations tabs. The customize chapter tab 605 enables customization and saving of chapter templates 605 for future use. The chapter name 601 lists the name of the chapters for the workflow applications. Any new changes made by the user to the chapter template by addition of supplementary content is saved successfully as shown in FIG. 6.

FIGS. 7-9 show screen shots of the template generation for workflow applications in accordance with one or more embodiments described herein. FIGS. 7 and 8 shows a layout template selected by the user, where the user elements text controls, chart controls, media controls, table controls, BI tools controls etc. are laid out in phase 1 of the template generation. In phase 2 of the process, the selected layout template is used, wherein the user elements are associated with some specific identifiers, example the content for table to be rendered by processing of a backend calculation that will happen in future, configuring the content of a chart user element to be rendered by processing of a dataset and associated server processing at some point in the future. FIG. 9 shows a screenshot of the user interface where a user adds content or data to the selected chapter template to complete workflow and thereafter the changes to the template are saved for future use.

FIG. 10 illustrates an exemplary method for generating templates in accordance with one or more embodiments described herein. The method, 1000 may be implemented by the system as described above in FIGS. 2,3. The method 1000 is illustrated as logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. The order in which the operations are described is not intended to be construed as a limitation, and any number of the described operations can be combined in any order and/or in parallel to implement the method.

According to an embodiment, the method 1000 may be implemented by one or more processors or modules illustrated and explained through FIGS. 2,3, therefore detailed explanation of the same is omitted here for the sake of brevity.

The method begins at step 1001, wherein the method 1000 includes selecting a workflow to be performed by one or more users 206, 306 on the one or more client devices 201. In an embodiment, the plurality of client devices 201, 301 may be operable by one or more users 206, 306 of an enterprise or organization to manage workflows associated with business operations typically to achieve a particular business goal or objective. For example, an enterprise may have thousands of users (partners, clients, employees) who may perform various workflows related to business operations. The workflow applications in a manufacturing unit of an enterprise may, for example may include but not limited to annual product quality review, quality management review, recalling of faulty products, quality control issues, supply chain problems, regulatory compliance, etc. The workflows for these tasks require various users with different roles performing specific tasks like configuration, data analysis, project management, administrative tasks, approvals, executive responsibilities, etc.

At 1002, the method 1000 includes selecting a layout template comprising one or more user-interactive objects. In an embodiment, the operations at step 1002 may be performed by the system of FIGS. 2-3. In an embodiment, a user is able to select a layout template for generating the report comprising one or more user-interactive objects. In an embodiment, the one or more user-interactive objects may comprise user elements like text controls, chart controls, media controls, table controls, Business Intelligence (BI) tools controls etc. for completing the workflow process. The selection of layout template comprising the user elements may be phase 1 of the template generation where only layout for workflow like annual product quality report is enabled by the system. In an embodiment, the selected layout template is saved as a JSON. In an embodiment, the layout template saved as a JSON can be serialized and saved and retrieved by deserializing for future use.

At 1003, the method 1000 includes selecting a chapter template associating the one or more user-interactive objects to data to be rendered on the selected layout template, wherein the data and the one or more user-interactive objects are associated with the one or more workflows selected by the one or more users. In an embodiment, the operations at step 1003 may be performed by system of FIGS. 2-3. In an embodiment, a chapter template is selected associating the one or more user-interactive objects to data or content to be rendered on the selected layout template for the selected workflow. The data and the one or more user-interactive objects are associated with the one or more workflows selected by the one or more users. In an embodiment, the selection of chapter template on the selected layout template by the user may be phase 2 of the template generation process. For example, in phase 2 of the template generation, the user elements are associated with specific identifiers, like the content for table to be rendered by processing of a backend calculation that will happen in future, configuring the content of a chart user element to be rendered by processing of a dataset and associated server processing at some point in the future. In an embodiment, the selected chapter template is saved successfully as a JSON.

At 1004, the method 1000 includes updating the chapter template by adding supplementary data to complete the one or more workflows. In an embodiment, the operations at step 1004 may be performed by the system described in FIGS. 2-3. In an embodiment, the user may update the chapter template by adding supplementary data to complete the one or more workflows, for example report generation in annual product quality review. For example, the department user may use the saved template and add some supplementary data or content, for example, based on the domain knowledge-based analysis, annotations, additional supplementary content like additional charts etc. and update the chapter template in the process.

At step 1005, the method 1000 includes determining if the updated chapter template deviates from a standard chapter template beyond a pre-defined threshold, wherein the standard chapter template is a stored baseline template. In an embodiment, the operations at step 1004 may be performed by the system described in FIGS. 2-3. In an embodiment, the standard chapter template may be a baseline template stored set by the business administrator, for example based on previous iterations of the workflow and previously approved chapter templates for the user. For example, the chapter templates that are updated by the user 306 may be saved in the workflow management server 303 and validated to determine if the updated chapter template deviates from a certain threshold limit. In some embodiments, the threshold limits are defined based on previously approved chapter templates in previous iterations of the workflow. In an embodiment, the rules for defining threshold limits may be stored in the rules engine database. Based on the defined threshold limits, the deviations of the updated chapter templates from approved chapter templates are recorded.

At step 1006, the method 1000 includes notifying the one or more users in response to determining that the updated chapter template deviates from the standard chapter template beyond the pre-defined threshold at step 1005. In an embodiment, the operations at step 1004 may be performed by the system of FIGS. 2-3. For example, if a user 306 has updated a chapter template for report generation which indicates a marked deviation from previously approved reports, then the user is notified of such deviation. In an example, the rules for defining the threshold limits can be calculated based on counting the difference in the content of the JSON fields of the template JSONs which are current and which are stored historically. In an example, the threshold limits can be set based on the difference in the JSON fields between the updated chapter template JSON and the standard template JSON, which is the baseline template. If the difference in the JSON fields of the template JSONs exceeds a certain threshold limit, a notification is triggered to the user 306 alerting of the deviation. The updated chapter template is then saved as a new chapter template for future use for the workflows. For example, to stay compliant with approved reports templates, if the deviation of a particular chapter template from its previously approved chapter templates is greater than a certain level (for example between 25-75% depending upon business requirements), the chapter templates rules engine 308 may notify the user 306, where percentage of deviation could be based on counting the difference in content of JSON fields of various nodes in the template JSONs.

At step 1007, the method includes saving the updated chapter template as a new chapter template for the one or more workflows. In an embodiment, the operations at step 1004 may be performed by the system of FIGS. 2-3.

According to an embodiment, the auto suggestion of templates and the recording of deviations enables tracking the volume of changes made by the one or more users while completing a particular workflow. In some embodiments, the method enables tracking the volume of changes made at each chapter level, section and subsection level. In some embodiments, the deviations of chapter templates from previously approved templates for a particular product can be tracked. In some embodiments, the deviations of chapter templates from standard templates can be tracked. The tracking of changes made to the templates enables collection of data to provide recommendations in real time and to provide seamless and consistent workflow process.

FIG. 11 illustrates a general block diagram of an exemplary computing system 1100 used in system 200, 300 for generating templates according to an embodiment of the present disclosure. The computing system 1100 includes a processor 1101 which may be a single processing unit or a number of units, all of which could include multiple computing units. The processor 1101 may be implemented as one or more microprocessors, microcomputers, microcontrollers, digital signal processors, central processing units, logical processors, virtual processors, state machines, logic circuitries, and/or any devices that manipulate signals based on operational instructions. Among other capabilities, the processor 1101 is configured to fetch and execute computer-readable instructions and data stored in a memory 1102.

The memory 1102 may be any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes.

In an example, the computing system 1100 may include one or more software modules or components 1104 for managing workflow applications by providing standardized and customized templates in accordance with the one or more embodiments of the present disclosure. In an embodiment, the one or more software modules 1104 may include a program, a subroutine, a portion of a program, a software component or a hardware component capable of performing a stated task or function. As used herein, the modules may be implemented on a hardware component such as a server independently of other modules, or a module can exist with other modules on the same server, or within the same program. The module(s) 1104 may be implemented on a hardware component such as processor one or more microprocessors, microcomputers, microcontrollers, digital signal processors, central processing units, state machines, logic circuitries, and/or any devices that manipulate signals based on operational instructions. The module(s) 1104 when executed by the processor 1101 may be configured to perform any of the described functionalities. Specifically, the module(s) 1104 may be configured to implement the enabling efficient, scalable and flexible event-driven architecture.

The computing system 1100 may comprise a database 1103 and may be implemented with integrated hardware and software. The hardware may include a hardware disk controller with programmable search capabilities or a software system running on general-purpose hardware. Examples of databases are but not limited to, in-memory databases, cloud databases, distributed databases, embedded databases, and the like. The database amongst other things, serves as a repository for storing data processed, received, and generated by one or more of the processors 1101, and the module(s) 1104. In an embodiment, the modules 1104 may be implemented with an AI module.

The computing system 1100 comprises a display unit 1105 that includes a computer monitor, a touch screen, an output device capable of displaying the graphics, and the like. The display unit 1105 is configured to display visual output in desktops, laptops, and workstations.

The computing system 1100 comprises a network interface 1106 configured to provide and establish communication with any electronic device via a public network, private network, or any wireless communication technology.

Embodiments of the present disclosure may provide an efficient system and method for managing chained workflows in an enterprise. The system is aimed to provide a structured framework for managing workflow applications by enabling customized template generation. By standardizing the workflow templates, it is possible for organizations to adapt to evolving business requirements, making it easy and effective for the users to navigate through the internal business processes within an enterprise. The disclosed techniques streamline the workflow process by providing scalable processing, reducing costs, optimizing resources, reducing time spent on repetitive tasks, improved collaboration thereby providing enhanced system performance.

The disclosed system and method may also leverage the possibility of using Artificial intelligence (AI) models to implement the various functionalities disclosed herein. The AI models may be utilized to and manage the work environments of the business enterprises efficiently.

The figures of the disclosure are provided to illustrate some examples of the invention described. The figures are not to limit the scope of the depicted embodiments or the appended claims. Aspects of the disclosure are described herein with reference to the invention to example embodiments for illustration. It should be understood that specific details, relationships, and method are set forth to provide a full understanding of the example embodiments. One of ordinary skill in the art recognize the example embodiments can be practiced without one or more specific details and/or with other methods.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily refer to the same embodiment). The present disclosure intends to include specific reference to all combinations and sub combinations of physically compatible features, components, apparatuses, and processes described herein. As used herein, the term "or" is used in both the alternative and conjunctive sense, unless otherwise indicated. Use of any such aforementioned terms, or similarly interchangeable terms, should not be taken to limit the spirit and scope of embodiments of the present disclosure. As used in the specification and the appended claims. The singular form of "a," "an," and "the" include plural references unless otherwise stated. The terms "includes" and/or "including," when used in the specification, specify the presence of stated features, elements, and/or components, and/or groups thereof.

In an embodiment, the functional units have been labeled as modules, in order to more particularly emphasize their implementation independence. For example, a module may be implemented as a hardware or a software by various types of processors. A module of executable code may, for instance, comprise one or more physical or logical blocks of computer instructions, which may, for instance, be organized as an object, procedure, or function. Nevertheless, the executables of a module need not be physically located together, but may comprise disparate instructions stored in different locations which, when joined logically together, comprise the module and achieve the stated purpose for the module.

Aspects of the present disclosure may be implemented as computer program products that comprise articles of manufacture. Such computer program products may include one or more software components including, for example, applications, software objects, methods, data structure, and/or the like. In some embodiments, a software component may be stored on one or more non-transitory computer-readable media, which computer program product may comprise the computer-readable media with software component, comprising computer executable instructions, included thereon. The various control and operational systems described herein may incorporate one or more of such computer program products and/or software components for causing the various conveyors and components thereof to operate in accordance with the functionalities described herein.

A software component may be coded in any of a variety of programming languages. An illustrative programming language may be a lower-level programming language such as an assembly language associated with a particular hardware architecture and/or operating system platform/system. Other example of programming languages included, but are not limited to, a macro language, a shell or command language, a job control language, a script language, a database query, or search language, and/or report writing language. In one or more example embodiments, a software component comprising instructions in one of the foregoing examples of programming languages may be executed directly by an operating system or other software component without having to be first transformed into another form. A software component may be stored as a file or other data storage methods. Software components of a similar type or functionally related may be stored together such as, for example, in a particular directory, folder, or repository. Software components may be static (e.g., pre-established, or fixed) or dynamic (e.g., created or modified at the time of execution).

Processor may be embodied in a number of different ways. In various embodiments, the use of the terms "processor" should be understood to include a single core processor, a multi-core processor, multiple processors and/or one or more remote or "cloud" processor(s). In some example embodiments, processor may include one or more processing devices configured to perform independently. In some embodiments, the processor includes hardware, software, firmware, and/or a combination thereof that performs one or more operations described herein.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some embodiments, a storage system or other management entity within the artificial intelligence and machine learning infrastructure may also implement automated training with continuous learning based on new data.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

What is claimed:

1. A method for generating templates for a workflow application comprising:

- selecting a workflow to be performed by one or more users;
- selecting a layout template comprising one or more user-interactive objects;
- selecting a chapter template associating the one or more user-interactive objects to data to be rendered on the selected layout template, wherein the data and the one or more user-interactive objects are associated with the one or more workflows selected by the one or more users;
- updating the chapter template by adding supplementary data to complete the one or more workflows;
- determining if the updated chapter template deviates from a standard chapter template beyond a pre-defined threshold, wherein the standard chapter template is a stored baseline template;
- in response to determining that the updated chapter template deviates from the standard chapter template beyond the pre-defined threshold, notifying the one or more users; and
- saving the updated chapter template as a new chapter template for the one or more workflows.

2. The method of claim 1, wherein the layout template and the chapter template are saved in JSON format.

3. The method of claim 1, wherein the pre-defined threshold is calculated by comparing difference in values of JSON fields of the standard chapter template and the updated chapter template.

4. The method of claim 1, further comprising monitoring volume of change to the chapter template associated with one or more workflows based on different users and user roles.

5. The method of claim 1, further comprising monitoring the volume of change at chapter level, section level and subsection level.

6. The method of claim 1, further comprising monitoring the deviation of chapter templates from previously approved chapter templates of a particular product.

7. The method of claim 1, wherein the one or more user-interactive objects on the layout template comprises at least one of text controls, chart controls, media controls, table controls, BI tools controls.

8. The method of claim 1, wherein the data rendered on the chapter template comprises at least one of tables, text, data visualizations for the one or more workflows selected by the one or more users.

9. A system for generating templates for a workflow application, the system comprising:

- a processor; and
- a memory storing program instructions which, when executed by the processor, causes the processor to:
  - select a workflow to be performed by one or more users;
  - select a layout template comprising one or more user-interactive objects;
  - select a chapter template associating the one or more user-interactive objects to data to be rendered on the selected layout template, wherein the data and the one or more user-interactive objects are associated with the one or more workflows selected by the one or more users;
  - update the chapter template by adding supplementary data to complete the one or more workflows;
  - determine if the updated chapter template deviates from a standard chapter template beyond a pre-defined threshold, wherein the standard chapter template is a stored baseline template;
  - in response to determining that the updated chapter template deviates from the standard chapter template beyond the pre-defined threshold, notify the one or more users; and
  - save the updated chapter template as a new chapter template for the one or more workflows.

10. The system of claim 9, wherein the layout template and the chapter template are saved in JSON format.

11. The system of claim 9, wherein the pre-defined threshold is calculated by comparing difference in values of JSON fields of the standard chapter template and the updated chapter template.

12. The system of claim 9, wherein the processor is configured to monitor volume of change to the chapter template associated with one or more workflows based on different users and user roles.

13. The system of claim 12, wherein the processor is configured to monitor the volume of change at chapter level, section level and subsection level.

14. The system of claim 9, wherein the processor is configured to monitor the deviation of chapter templates from previously approved chapter templates of a particular product.

15. The system of claim 9, wherein the one or more user-interactive objects on the layout template comprises at least one of text controls, chart controls, media controls, table controls, BI tools controls.

16. The system of claim 9, wherein the data rendered on the chapter template comprises at least one of tables, text, data visualizations for the one or more workflows selected by the one or more users.

17. A non-transitory computer-readable storage medium, storing program instructions for generating templates for a workflow application, the program instructions, when executed, perform the steps of:

selecting a workflow to be performed by one or more users;

selecting a layout template comprising one or more user-interactive objects;

selecting a chapter template associating the one or more user-interactive objects to data to be rendered on the selected layout template, wherein the data and the one or more user-interactive objects are associated with the one or more workflows selected by the one or more users;

updating the chapter template by adding supplementary data to complete the one or more workflows;

determining if the updated chapter template deviates from a standard chapter template beyond a pre-defined threshold, wherein the standard chapter template is a stored baseline template;

in response to determining that the updated chapter template deviates from the standard chapter template beyond the pre-defined threshold, notify the one or more users; and saving the updated chapter template as a new chapter template for the one or more workflows.

18. The computer readable medium of claim 17, comprising program instructions to perform the step of: monitoring volume of change to the chapter template associated with one or more workflows based on different users and user roles.

19. The computer readable medium of claim 18, comprising program instructions to perform the step of: monitoring the volume of change at chapter level, section level and subsection level.

20. The computer readable medium of claim 17, comprising program instructions to perform the step of: monitoring the deviation of chapter templates from previously approved chapter templates of a particular product.

* * * * *